US005841117A

United States Patent [19]

Pauly

[11] Patent Number: 5,841,117

[45] Date of Patent: Nov. 24, 1998

[54] METHOD FOR THE DETECTION OF METER RELOCATION USING RETURN ADDRESS

[75] Inventor: Steven J. Pauly, New Milford, Conn.

[73] Assignee: Pitney Bowes Inc., Stamford, Conn.

[21] Appl. No.: 773,508

[22] Filed: Dec. 24, 1996

[51] Int. Cl.[6] .......... G06F 15/20

[52] U.S. Cl. .......... 235/375; 705/410

[58] Field of Search .......... 235/375, 380, 235/381, 382, 382.5; 705/410

[56] References Cited

U.S. PATENT DOCUMENTS

| | | | |
|---|---|---|---|
| 4,429,217 | 1/1984 | Hill et al. | 235/380 |
| 4,731,741 | 3/1988 | Allen | 395/111 |
| 4,800,506 | 1/1989 | Axelrod et al. | 235/375 |
| 4,873,645 | 10/1989 | Hunter et al. | 364/479.01 |
| 4,900,903 | 2/1990 | Wright et al. | 235/380 |
| 4,907,161 | 3/1990 | Sansone et al. | 235/375 |
| 5,121,945 | 6/1992 | Thomson et al. | 283/58 |
| 5,200,007 | 4/1993 | Svyatsky | 156/64 |
| 5,319,562 | 6/1994 | Whitehouse | 705/403 |
| 5,387,783 | 2/1995 | Mihm et al. | 235/375 |
| 5,602,743 | 2/1997 | Freytag | 235/375 |
| 5,606,507 | 2/1997 | Kara | 235/381 |
| 5,625,694 | 4/1997 | Lee et al. | 705/1 |
| 5,666,284 | 9/1997 | Kara | 235/380 |

*Primary Examiner*—Anita Pellman Gross
*Assistant Examiner*—Drew A. Dunn
*Attorney, Agent, or Firm*—Charles R. Malandra, Jr.; Melvin J. Scolnick

[57] ABSTRACT

A method is provided for detecting the relocation of a postage metering system. The method includes initializing the postage metering system with a user postal code which is stored in the postage metering system. When a mailpiece is prepared, its return address postal code is compared to the user postal code. When the return address postal code is different than the user postal code, the user is alerted to the difference. When the user postal code is confirmed as being allowable, the envelope is printed. When the user postal code is not allowable according to postal regulations, the user postal code is reset to correspond to a licensing post office for the return address of the mailpiece.

9 Claims, 4 Drawing Sheets

METHOD FOR THE DETECTION OF METER RELOCATION USING RETURN ADDRESS

FIELD OF THE INVENTION

The present invention relates to postage metering systems and more particularly to tracking the relocation of postage metering systems.

BACKGROUND OF THE INVENTION

The Information-Based Indicia Program (IBIP) is a distributed trusted system proposed by the United States Postal Service (USPS). The IBIP is expected to support new methods of applying postage in addition to, and eventually in lieu of, the current approach, which typically relies on a postage meter to mechanically print indicia on mailpieces. The IBIP requires printing large, high density, two dimensional (2-D) bar codes on mailpieces. The Postal Service expects the IBIP to provide cost-effective assurance of postage payment for each mailpiece processed.

The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

The user infrastructure, which resides at the user's site, comprises a postage security device (PSD) coupled to a host system. The PSD is a secure processor-based accounting device that dispenses and accounts for postal value stored therein. The host system (Host) may be a personal computer (PC) or a meter-based host processor.

It is expected that once the IBIP is launched, in particular when PC-based meters are introduced, the volume of active meters will increase significantly. Such volume increase is expected to occur predominately in the small office and home office (SOHO) market. This will result in a new class of postage meter users that are not familiar with the USPS postal regulations that are set forth in the Domestic Mail Manual, commonly referred to as the DMM. Such regulations include the responsibility of a meter user to notify the USPS or the meter vendor whenever a meter is relocated.

Under conventional postage evidencing infrastructure, communications have been point to point, with limited, meter specific information transmitted to and from conventional meters. Under the IBIP, postage metering is evolving in a manner consistent with new communications technology, such as networked computer systems, internet, cellular communications and the like. Thus, IBIP meters, and in particular PC meters, are easily moved to any geographic location within the United States. Such movement of meters is regulated by the USPS.

Digital evidence of postage payment and funds distribution to licensing post offices depend on the accurate tracking of the meter location and registration to a licensing post office postal code. For a PC meter, the host PC and PSD can easily be moved from one location to another. The DMM sets forth the responsibility of the meter customer to inform the PSD vendor, such as the assignee of the present invention, or the USPS that the move has occurred and the identity of the new location of use. Since a PC meter is an open system, i.e., is not dedicated to performing only postage metering, that is easily transportable, the user may be unaware of or may not remember the USPS regulations governing such relocation. It is likely that the USPS will continue to accept and process mail from such SOHO PC meter users even though they may no longer reside in the licensing post office area. Thus, it is likely that over time, the list of meters and associated licensing post offices will become inaccurate, resulting in incorrect funds distribution to such licensing post offices.

SUMMARY OF THE INVENTION

The present invention resolves conflicts between a return address and a licensing post office. It has been found that the relocation of PC meters may be detected and updated by checking the return address printed on a mailpiece.

When a mailpiece is prepared and then mailed, there are four addresses of concern to the USPS: the destination address, the user home/office address, the submission address and the return address. The IBIP requires the inclusion of a destination address in the revenue block (indicium) printed on each mailpiece. Since the mailpiece information is available to the PC meter application software, it has been found that the return address could also be made available to the application software and used to resolve the relocation problem. In accordance with the present invention, when the PC meter, i.e., the (PSD), is registered, the licensing post office postal code is downloaded to the PC meter and application software. The application software uses this information, in conjunction with the mailpiece return address, to determine if the PC meter has been relocated to a location serviced by another post office.

It has been found that the present invention reduces the chance of rejected mail after a meter move. The present invention provides an indication and support for meter regulation compliance. It has further been found that the present invention provides better tracking of meters within each licensing post office, and an accurate distribution of customer postal funds to the correct licensing post office.

The present invention provides a method for detecting the relocation of a postage metering system. The method includes initializing the postage metering system with a user postal code which is stored in the postage metering system. When a mailpiece is prepared, its return address postal code is compared to the user postal code. When the return address postal code is different than the user postal code, the user may be alerted to the difference. When the user postal code is confirmed as being allowable, the envelope is printed. When the user postal code is not allowable according to postal regulations, the user postal code may be reset to correspond to a licensing post office for the return address of the mailpiece.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

The present invention provides a method for a customer to comply with USPS regulations when using a return address where the meter is located. The present invention allows the customer to prepare mail for both home/office address and other return addresses. Warning indicators may be used to notify the customer that a non-home/office postal code is used in the return address. The user may be allowed to bypass the warning or, more importantly, may be linked to processes for completing the meter move.

Figure 1:
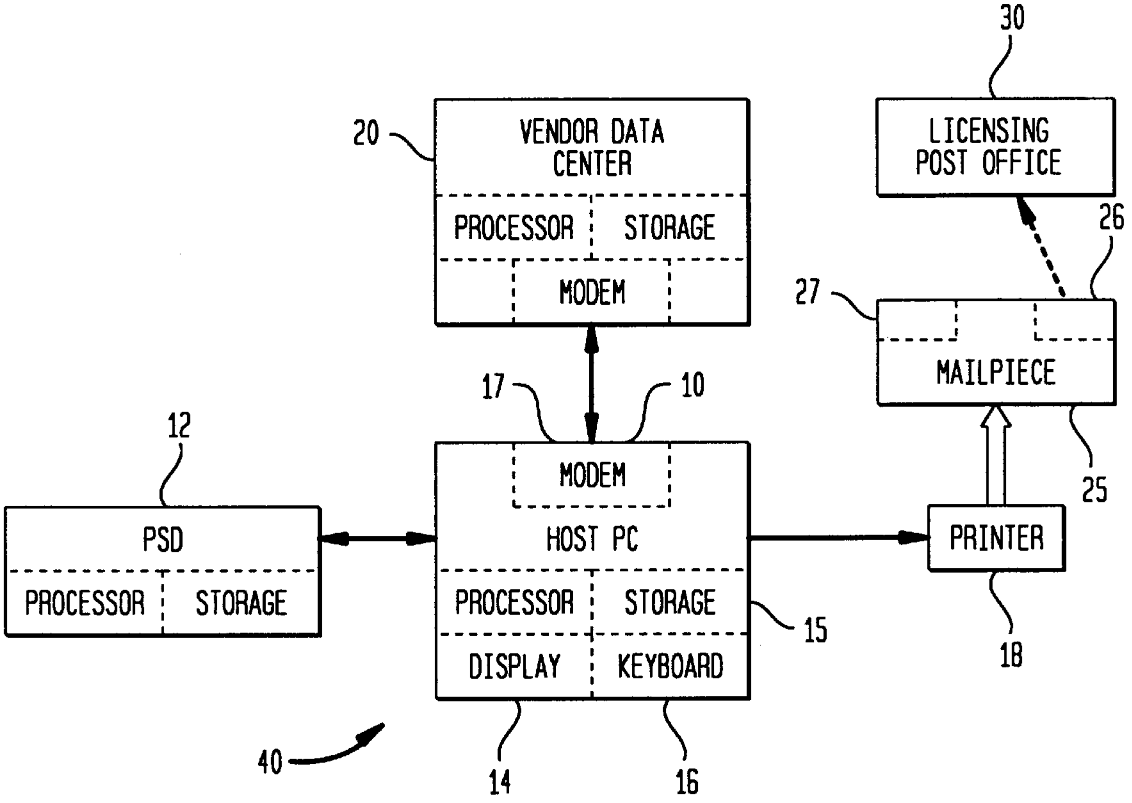
FIG. 1 is a block diagram of a postal system in which the present invention operates.

In describing the present invention, reference is made to the drawings, wherein there is seen in FIG. 1 a postal system in which the present invention operates. A host PC 10 is coupled to a PSD 12 and a printer 18. The host PC 10 is a conventional personal computer system, including processor, hard drive, display and keyboard. The host PC 10 is connected, for example, by modem, network or other communication means, to a vendor data center 20. A licensing Post Office 30 is the Post Office to which PSD is licensed to submit mailpieces in accordance with postal regulations.

A user submits to the vendor data center 20 required license information, including licensing Post Office identification. The user purchases or leases the PSD 12 from a PSD vendor or from a retail store. The PSD 12 is connected to a conventional PC 10, including a display 14, hard drive 15, keyboard 16, modem 17 and printer 18. The user then activates the PSD 12, by submitting to the vendor data center 20 PSD related information, including serial number and user information. The vendor data center 20 activates the PSD 12 by sending certain information including a postal code for the licensing Post Office 30 which is stored, preferably in the PSD 12, in the now activated PC meter, generally designated 40. Each mailpiece 25, which is prepared by the PC meter 40 and includes an indicium 26 and return address 27, further includes the postal code for the licensing Post Office 30 as well as a unique identification of the PSD 12.

Information Preparation Phase

When a meter user agrees to purchase or lease a PSD 12, a set of user information will be provided to allow a meter license to be processed. This information is transmitted to the vendor server where a license application is prepared. At that time the meter user may wish to submit mail outside his local post office. If so the alternate post office will be identified in the license submission. This application is processed by postal systems and the approved license is returned to vendor server for future download to the PC meter 40.

Figure 2:
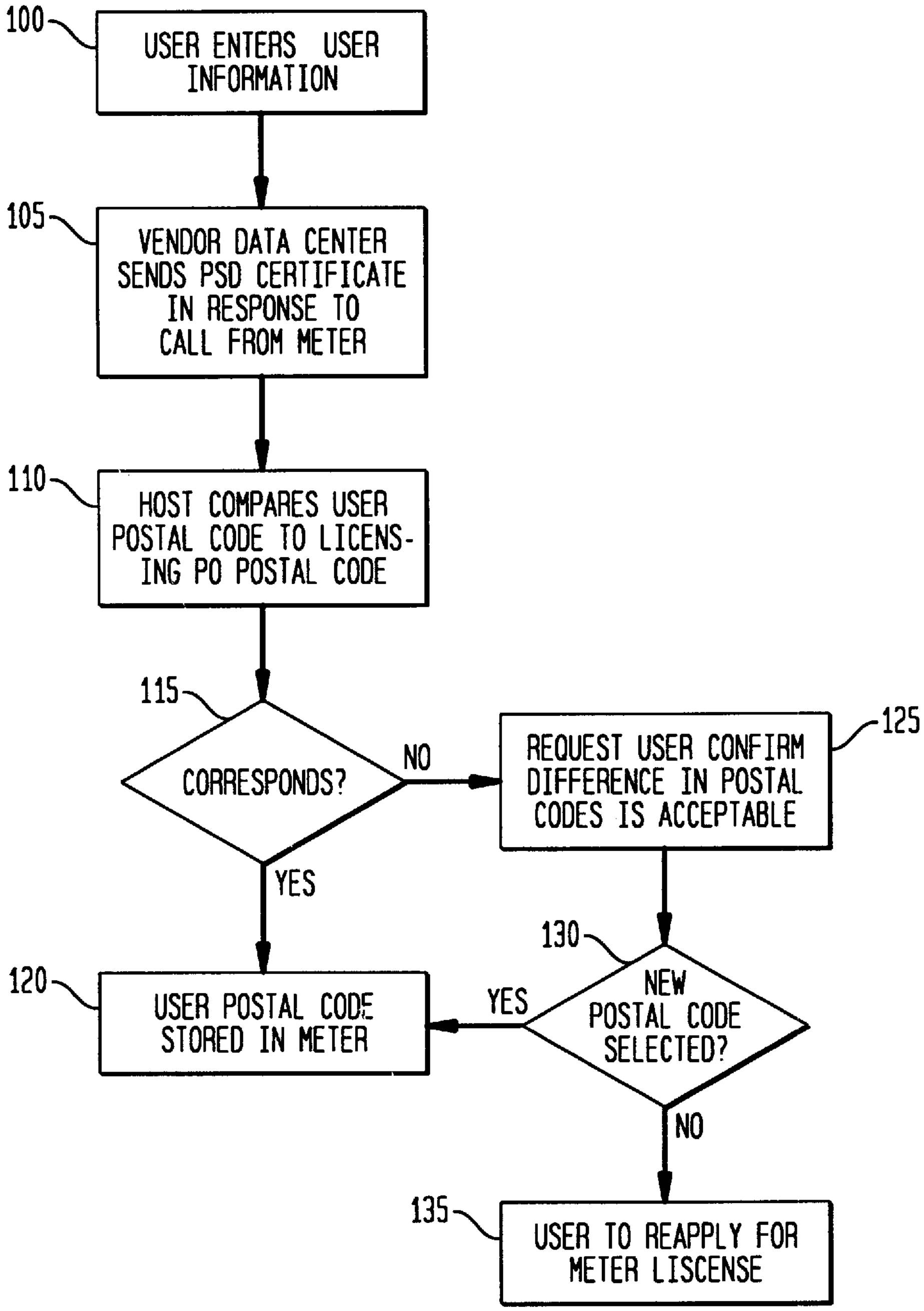
FIG. 2 is a flow chart of the information preparation phase of the present invention.

Referring now to FIG. 2, at step 100, when the meter user installs the PSD 12 on the Host computer 10, the user is prompted to enter user information. Such information includes the address of the meter user location and a postal code of the user location, referred to herein as the user postal code. At step 105, the meter user dials into the Vendor data center 20 and receives a PSD certificate which includes a postal code for the licensing post office 30. At step 110, the host computer compares the user postal code with the licensing post office postal code. If the user postal code corresponds, at step 115, to the licensing post office postal code, the user postal code is stored, at step 120, in the host computer for future reference. If the user postal code is different than the licensing post office postal code, the user is asked, at step 125, by the host computer 10 to confirm that the difference is reasonable and correct. For example, the user may intend to submit mail in a different location (town A), than indicated in the user postal code (town B), or the local post office for the user location does not support metering and another post office is responsible for such meter licensing. If a different postal code is selected, at step 130, the selected postal code is stored, at step 120, as the user postal code for future reference. If a different postal code is not selected, then the user will be asked, at step 135, to reapply for the meter license and the host 10 displays the current licensing post office postal code. The user should now contact the vendor services to remedy the situation. The foregoing is a one time initialization of the PSD.

Meter Relocation Detection

Figure 3:
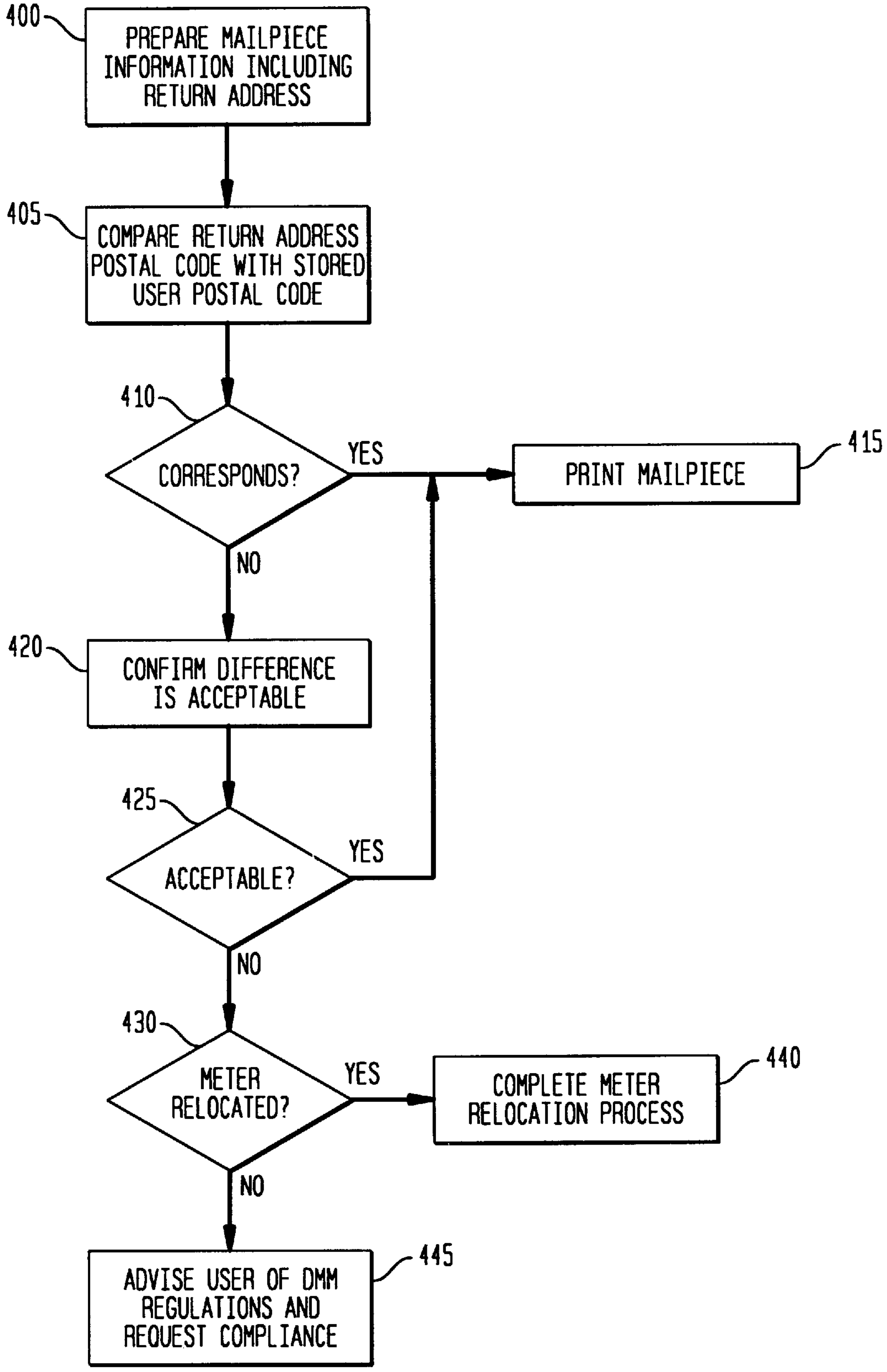
FIG. 3 is a flow chart of meter relocation detection.

Referring now to FIG. 3, the meter user, at step 400, prepares mailpiece information on the host computer 10. The mailpiece information may include the return address of the user. Prior to the envelope printing process, the host 10, at step 405, compares the return address postal code with the user postal code stored in the PC meter 40, i.e. in the host PC 10 or the PSD 12. If the return address postal code, at step 410, corresponds to the user postal code, the mailpiece may be processed normally, at step 415. By "corresponds to", it is meant that the ZIP code of the return address is for the correct licensing Post Office 30 in accordance with the DMM. If the return address postal code does not correspond to the user postal code, the user is asked, at step 420, to confirm that the difference is reasonable and correct. For example, the user may be mailing on behalf of another party, which has a different location than the user, but intends to submit mail in the licensing post office for the meter, or the user is submitting limited (a handful by DMM regulations) mailpieces to a post office different than the licensing post office. If the difference is not from an allowable exception, at step 425, the user is asked to confirm, at step 430, if the meter has been moved from the licensing post office area. If so, the user is prompted, at step 440, to complete the meter move process, for example by reapplying for a license or contacting vendor services. If not a meter move, the user is informed, at step 445 of the DMM regulations and asked to correct the condition.

Lost/Stolen Scenario

Figure 4:
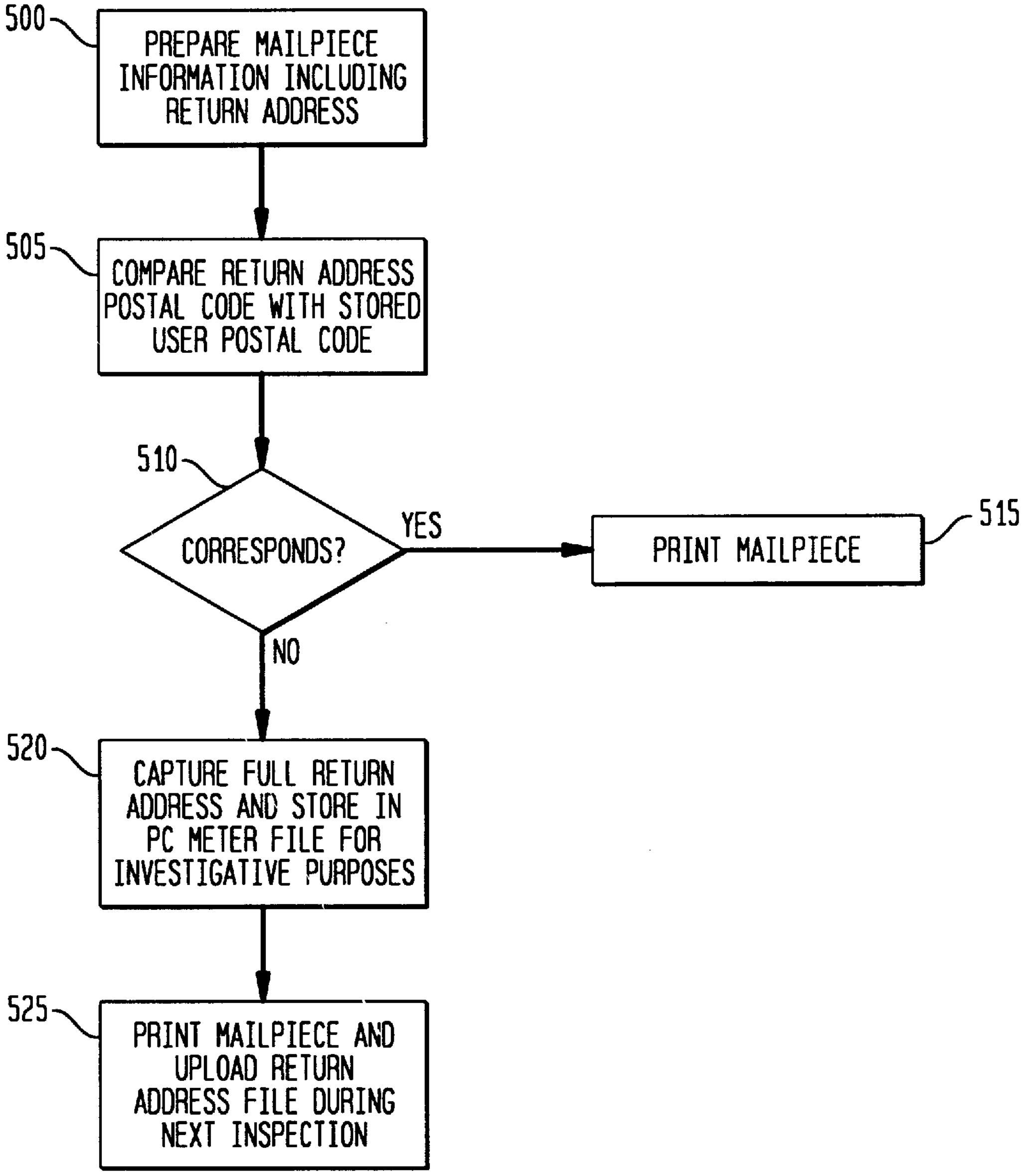
FIG. 4 is a flow chart of detecting a stolen meter.

Referring now to FIG. 4, at step 500, the meter user prepares mailpiece information on the host computer 10. Such mailpiece information may include the return address. Prior to the envelope printing process, the host 10, at step 505, compares the return address postal code with the stored user postal code. If, at step 510, the return address postal code corresponds to the user postal code, the mailpiece may be processed normally at step 515. If the return address postal code does not correspond to the user postal code, at step 520, the envelope (i.e. the mailpiece) is printed and further actions can be taken. For example, the full return address is captured and stored in a computer file for investigative purposes. During a subsequent meter inspection process, the captured return address list is uploaded, at step 525, to the Vendor data center 20.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. A method for detecting the relocation of a postage metering system, the method comprising the steps of:

initializing the postage metering system with a user postal code;

storing the user postal code in the postage metering system;

preparing a mailpiece;

comparing a return address postal code to be printed on the mailpiece with the user postal code;

identifying when the return address postal code is different than the user postal code;

and printing the mailpiece when the user postal code is confirmed as being allowable.

2. The method of claim 1 comprising the further steps of:

alerting a user when the return address postal code is different than the user postal code;

confirming that the user postal code is allowable according to postal regulations.

3. The method of claim 1 comprising the further step of:

resetting the user postal code to correspond to a licensing post office for the return address of the mailpiece when the user postal code is not allowable according to postal regulations.

4. The method of claim 1 comprising the further step of:

resetting the return address to correspond to a licensing post office for the return address of the mailpiece when the user postal code is not allowable according to postal regulations.

5. The method of claim 1 wherein the step of initializing the postage metering device includes the step of:

determining the user postal code based on a postal code of a licensing post office to which the metering device is assigned for submission of mailpieces prepared by the metering device.

6. The method of claim 1 comprising the further step of:

alerting a user when the return address postal code is different than the user postal code;

initiating a meter move process between the user and a service data center.

7. The method of claim 1 comprising the further step of:

storing the return address in the postage metering device when the return address postal code is different than the user postal code and the user postal code is not allowable according to postal regulations.

8. The method of claim 7 comprising the further step of:

transmitting the stored return address to a data center when the return address postal code is different than the user postal code.

9. The method of claim 7 comprising the further step of:

transmitting the stored return address to a data center.

* * * * *